Dec. 15, 1936.  H. E. SIPE  2,064,695
AIR VALVE
Filed June 11, 1935
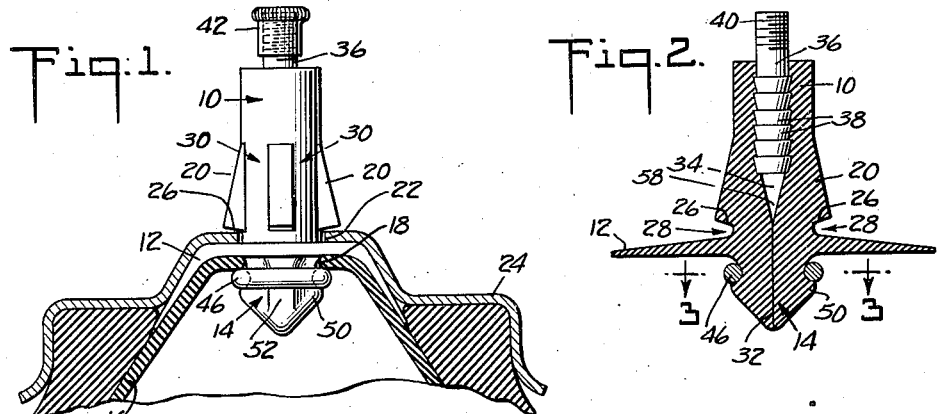
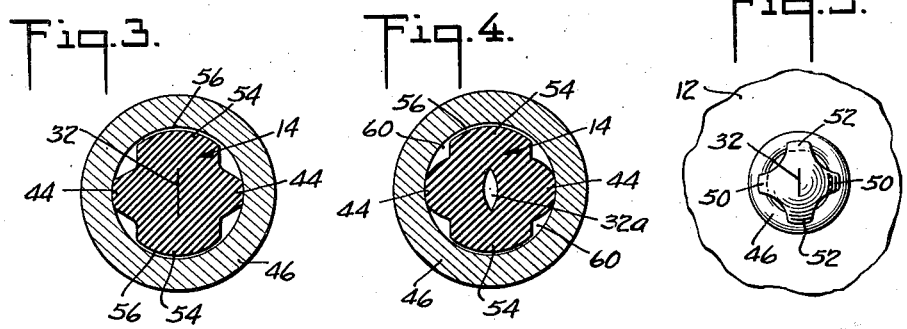
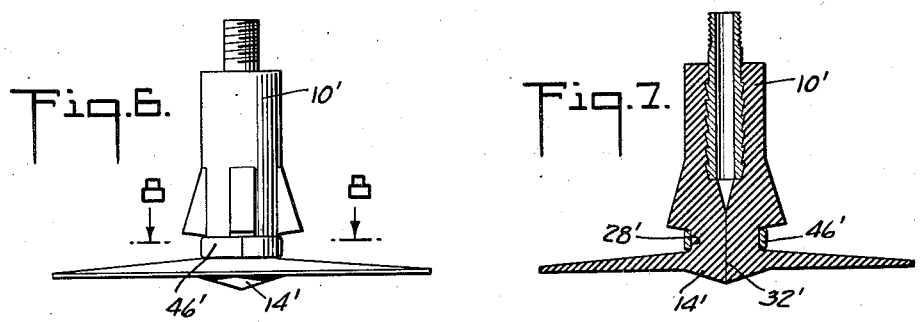
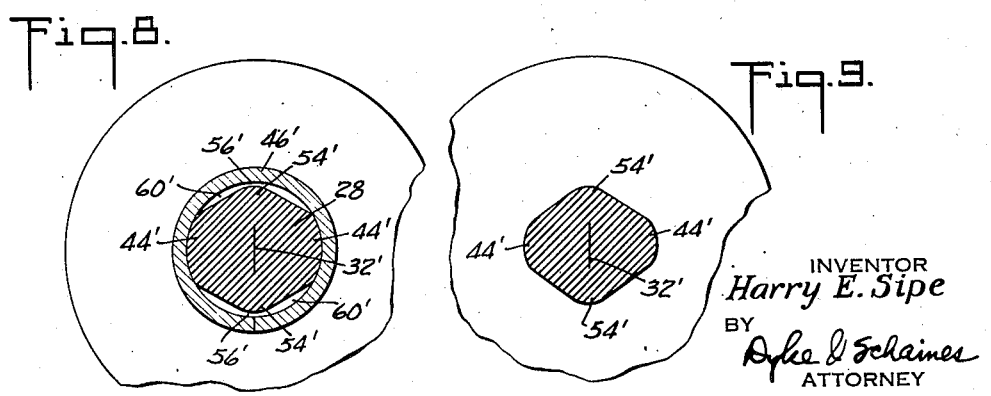
INVENTOR
*Harry E. Sipe*
BY
*Dyke & Schaines*
ATTORNEY Patented Dec. 15, 1936

2,064,695

UNITED STATES PATENT OFFICE 2,064,695

AIR VALVE

Harry E. Sipe, New York, N. Y., assignor of one-half to Nathaniel L. Foster, New York, N. Y.

Application June 11, 1935, Serial No. 25,970

6 Claims. (Cl. 152—12)

This invention relates to air valves and particularly to self-sealing air valves made of rubber and used in connection with pneumatic tubes.

One of the outstanding objects of the invention is to provide an air valve of great security against leakage.

A further object is to provide a valve without complicated parts which is exceedingly economical to manufacture.

Other objects are obvious or will appear from the following specification.

In the accompanying drawing showing two of the many possible embodiments of the invention, Fig. 1 is a side elevation of one form of valve in place on an inner tube in a tire casing;

Fig. 2 is a longitudinal section of the valve as shown in Fig. 1 prior to attachment to the inner tube;

Fig. 3 is a transverse section on the line 3—3, Fig. 2;

Fig. 4 is like Fig. 3, with the walls forced apart by air pressure during inflation;

Fig. 5 is a bottom plan view of Fig. 2;

Fig. 6 is a side elevational view of a modified form of valve;

Fig. 7 is a longitudinal section of Fig. 6;

Fig. 8 is a transverse section taken on line 8—8, Fig. 6; and

Fig. 9 is the same as Fig. 8 before the application of the ring shown in Fig. 8.

Having reference to the form of Figs. 1–5, the tire valve is of generally rod-like formation, made of soft rubber vulcanized in one piece and comprises an outer stem portion 10, a flange 12, and an inner stem portion 14 aligned with stem portion 10. Outer stem portion 10 is adapted to project outwardly beyond the inner tube 16, inner stem portion 14 projecting into the interior of the inner tube 16 through a hole 18 formed therein, and the tire valve is connected to the inner tube by the flange 12 being vulcanized or cemented to the outside of the inner tube 16.

The outer stem member 10 is provided with lugs 20 tapered at their upper sides to permit the stem to be readily pushed through the hole 22 in the rim 24, and said lugs 20 having squarely shouldered bottom end portions 26 so as to receive and retain the stem in the rim 24 with the rim received in the recess at 28 behind the shouldered portions 26. The entire body of rubber constituting the tire valve structure is relatively soft so that the outer stem 10 can be pushed back inwardly through the hole in the rim when required, the lugs 20 being separated by spaces 30 so as to provide room into which the rubber of lugs 20 can be caused to flow by application of sufficient force.

The tire valve is provided with an elongated axial normally closed slit 32 which is cut without removal of any part of the rubber after the rubber has been vulcanized, said slit 32 terminating at the inner end of the inner stem portion 14 and extending throughout the length of said inner stem portion and through the part of the stem provided with flange 12, and for at least part of the length of the outer stem portion 10, wherein it communicates with the preferably conically tapered end of the open bore 34 extending to the outer end of the outer stem 10. Bore 34 is provided with connecting means to receive air for inflation, and in the form shown is provided with a metallic tube 36 having the anchoring fins 38 and threaded outer end 40, which may receive a protecting and dust-excluding screw cap 42, said cap, however, not being expected to hold air pressure. A band of metal or the like (not shown) may be placed about the outer stem 10 to clamp same around the tube 36 if desired.

Provision is made for exerting pressure to assist in holding the slit 32 within the inner stem closed except during inflation, when same is distended as shown in Fig. 4. In the form shown, inner stem portion 14 is provided with projecting ribs 44, 44, which are arranged opposite the faces or walls of the slit 32. Said ribs 44 are compressed to some extent by an encompassing rigid ring 46, which may be of metal, hard rubber, bakelite, or the like, the normal diameter of stem part 14 through the ribs 44 being somewhat greater than the inner diameter of ring 46. Ring 46 is retained in place by terminal ears or lugs 50 formed on said ribs 44 and also by similar ears 52 provided in the ribs 54 now to be described. Said ribs 54 are likewise formed on stem portion 14, but are arranged halfway between ribs 44 and opposite the edges of slit 32 and normally project from stem 14 a less distance than ribs 44, and a less distance than the inner diameter of ring 46, so as to leave a clearance as indicated at 56 within the ring 46. This ring 46 exerts compression on ribs 44 of stem portion 14 to assist in keeping slit 32 normally closed, but no compression is exerted by ring 46 on ribs 54 in the edgewise direction of slit 32, which would counteract the effect of compression of the slit faces together and tend to open or spread said slit.

To inflate, air under pressure is supplied to tube 36 and being led by the tapered lower end 58 of bore 34 to slit 32, same is spread open as indicated at 32a, Fig. 4, and the compressed air delivered therethrough to the interior of tube 16, the rubber within ring 46 flowing into the open spaces 60 provided between ribs 44 and 54. The inner end of slit 32 terminates abruptly in the preferably convex end portion of the inner stem portion 14 and the air pressure upon the inner stem 14 cooperates with the compression due to ring 46 exerted through ribs 44 to keep the slit 32 securely sealed against egress of compressed air. By having the slit 32 extending on both the inside and outside of the wall of the tire tube 16, whereby it is possible to have the slit several times as long as wide, if small pieces of foreign matter should become lodged within the slit 32 same will not open slit 32 for a sufficient portion of its length to unseal the closure formed by the slit walls and permit air to escape, and upon subsequent inflation the piece of dirt or other foreign matter will escape through slit 32 into the tube. The tire tube can be deflated by inserting a fine rod or tube through slit 32.

In the form shown in Figs. 6-9, the inner stem portion 14 is replaced by the short inner stem or convexity 14', and the means for holding the slit 32' under compression is disposed upon that part 28' of the outer stem 10' which passes through the usual stem-receiving hole in the rim. By using a ring 46', such as a split metal ring, at this region, same serves both as a means for imparting compression to the rubber to hold the slit closed and to armor this part of the stem against wear thereof by the rim edges about the hole thereon for receiving the tire valve stem.

The portions 54' in line with and opposite the edges of slit 32' are not under compression by ring 46', a clearance being provided at 56', whereas at the regions 44', 44' opposite the sides or faces of slit 32' the rubber is under compression, said parts 44' extending beyond the diameter of the opening in ring 46' prior to application of ring 46', as indicated in Fig. 9. Open spaces 60' are left between regions 44' and 54' to provide for flow of the rubber when the tube is being inflated and slit 32' is distended.

It is of advantage with both forms to so arrange the tire valve that the faces of slit 32 or 32' will be parallel to the side walls of the tube, the transverse curvature of the tube with such arrangement being of assistance in producing compression closing of the slit through the resulting inward curvature of the flange and also of the inner stem or convexity wherein the slit terminates.

The metal tube 36 can be dispensed with for other uses such as rubber bladders for inflated balls, rubber toys, and the like.

It is to be understood that the embodiments here presented are for illustration only and that the invention is of the scope defined by my claims.

I claim:

1. In a tire valve a slitted rubber member of greatest transverse dimension at right angles to the slit wall faces, and a rigid ring encircling said member and engaging and compressing only the said portions of greatest dimension.

2. In a tire valve a rubber stem provided with a longitudinal slit, rigid means about the stem engaging parts of the stem adapted to force the slit walls together, and spaces being provided elsewhere between the stem and said means wherein the rubber may flow when the slit is expanded by ingress of air under pressure.

3. In a valve, a rubber member having a slit running longitudinally therethrough, and means for confining portions of the rubber member facing the slit walls against expansion while leaving adjacent portions unconfined, whereby the rubber must flow in other directions to permit slit expansion.

4. In a rubber valve, a body member having a tubular bored portion and a longitudinally slitted portion, the bore leading to the slit, and means encircling the slitted portion of the body and engaging portions of the rubber member facing the slit walls to prevent expansion thereof in a direction at right angles to the plane of the slit while leaving adjacent portions unconfined, whereby to normally prevent the opening of the slit and passage of air therethrough, and to permit such opening and air passage only by flow of said slitted rubber body portion in other directions.

5. In a valve, a rubber body member, a normally closed longitudinal slit therethrough providing a duct therethrough, and means to hold the exterior of said body member at regions facing the slit walls in fixed relationship while leaving adjacent portions unconfined.

6. In a tire valve, a rubber member having a longitudinal slit therethrough, the greatest transverse dimension of said member being at right angles to the plane of said slit, and means fixedly applied to said member and engaging the member at opposite regions in the parts of such greatest dimension to hold the facing walls of the slit normally in contact, while leaving adjacent portions unconfined.

HARRY E. SIPE.